United States Patent
Ferentz et al.

(10) Patent No.: US 7,337,336 B2
(45) Date of Patent: Feb. 26, 2008

(54) METHOD FOR RAPID PORT POWER REDUCTION

(75) Inventors: Alon Ferentz, Bat Yam (IL); Roni Blaut, Netanya (IL); Oren Lavi, Yavne (IL)

(73) Assignee: Microsemi Corp.-Analog Mixed Signal Group Ltd., Hod Hasharon (IL)

(*) Notice: Subject to any disclaimer, the term of this patent is extended or adjusted under 35 U.S.C. 154(b) by 339 days.

(21) Appl. No.: 11/118,420

(22) Filed: May 2, 2005

(65) Prior Publication Data

US 2005/0272402 A1    Dec. 8, 2005

Related U.S. Application Data

(60) Provisional application No. 60/569,235, filed on May 10, 2004.

(51) Int. Cl.
*G06F 1/00*    (2006.01)

(52) U.S. Cl. .................................................. 713/300

(58) Field of Classification Search ............... 713/300, 713/310, 320–324, 330, 340
See application file for complete search history.

(56) References Cited

U.S. PATENT DOCUMENTS

| | | | |
|---|---|---|---|
| 5,483,656 A | 1/1996 | Oprescu et al. | |
| 5,544,064 A | 8/1996 | Beckwith | 364/483 |
| 5,550,702 A | 8/1996 | Schmidt et al. | 361/103 |
| 5,612,580 A | 3/1997 | Janonis et al. | 307/64 |
| 5,652,893 A | 7/1997 | Ben-Meir et al. | 395/750 |
| 5,969,515 A | 10/1999 | Oglesbee | 323/283 |
| 5,986,902 A | 11/1999 | Brkovic et al. | 363/50 |
| 6,101,108 A | 8/2000 | Wittenbreder, Jr. | 363/65 |
| 6,108,183 A | 8/2000 | Beene | 361/93.8 |
| 6,144,194 A | 11/2000 | Varga | 323/285 |
| 6,404,607 B1 | 6/2002 | Burgess et al. | 361/58 |
| 6,473,608 B1 | 10/2002 | Lehr et al. | 455/402 |
| 6,643,566 B1 | 11/2003 | Lehr et al. | 700/286 |

(Continued)

FOREIGN PATENT DOCUMENTS

JP    07281798 A2    10/1995

(Continued)

OTHER PUBLICATIONS

PCT Int'l Search Report, filed Oct. 28, 2005, Ferentz et al.

(Continued)

*Primary Examiner*—A. Elamin
(74) *Attorney, Agent, or Firm*—Simon Kahn (57) ABSTRACT

A method for rapidly reducing power in the event of a change in power source conditions, comprising: obtaining an indicator of one of current power consumption of ports being supplied power and current power allocation of ports being supplied power; storing for at least one possible power source condition different than a current power source condition identifiers of ports being supplied power for which power is to be reduced, the identifiers being associated with the at least one power source condition; and in the event of a change in power source condition from the current power source condition to a revised power source condition; identifying the revised power source condition as one of the at least one power source condition; and reducing power to ports in accordance with the stored identifiers associated with the revised power source condition.

33 Claims, 6 Drawing Sheets

U.S. PATENT DOCUMENTS

| | | |
|---|---|---|
| 6,721,672 B2 | 4/2004 | Spitaels et al. |
| 6,841,979 B2 | 1/2005 | Berson et al. ............... 323/282 |
| 7,043,647 B2 * | 5/2006 | Hansen et al. .............. 713/320 |
| 7,142,951 B2 * | 11/2006 | Pincu et al. ................. 700/297 |
| 7,146,258 B2 * | 12/2006 | Pincu et al. ................. 700/297 |
| 7,155,622 B2 * | 12/2006 | Mancey et al. .............. 713/324 |
| 7,159,129 B2 * | 1/2007 | Pincu et al. ................. 713/300 |
| 7,203,849 B2 * | 4/2007 | Dove ........................ 713/300 |
| 7,240,225 B2 * | 7/2007 | Brewer et al. .............. 713/300 |
| 2003/0065958 A1 | 4/2003 | Hanson et al. |
| 2005/0243861 A1 * | 11/2005 | Elkayam et al. ............ 370/466 |

FOREIGN PATENT DOCUMENTS

WO     WO 96/19764     6/1997

OTHER PUBLICATIONS

PCT Written Opinion, filed Oct. 28, 2005, Ferentz et al.
Translation of First Office Action of China Patent Office for Parallel Application 200580014451, mailed Sep. 7, 2007.

* cited by examiner

Prior Art

METHOD FOR RAPID PORT POWER REDUCTION

CROSS-REFERENCE TO RELATED APPLICATIONS

This application claims priority of U.S. Provisional Patent Application Ser. No. 60/569,235 filed May 10, 2004 entitled "Method for Rapid Port Power Reduction" the entire contents of which is herein incorporated by reference.

BACKGROUND OF THE INVENTION

The present invention relates to the field of power systems, and more particularly to an algorithm for rapidly reducing power to ports in the event of a failure of one of a plurality of power sources.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

Power over Ethernet is typically a scalable technology, in which an initial installation may supply power functionality to a limited number of ports in the system. Over time, additional ports may be powered, with a resultant need for additional sources of power. Each port supplies power to a connected powered device, with power being transmitted from the port to the powered device over the structured communication cabling. One well developed method of adding additional power to a system is the use of a plurality of power sources, or power banks, which are connected together in a "wired or" type arrangement. Other methods of connecting power systems in parallel are known to those skilled in the art, and include any method which is operable to supply the sum of the connected power sources to one or more connected loads.

A major difficulty in the use of a plurality of power sources is the action that must be taken in the event of a failure, or reduced output, of one of the plurality of power sources. For example, in a network in which power over Ethernet is supplied, powered devices receive their power from a central power sourcing equipment. In the event of a failure of one of the plurality of power sources powering the central power sourcing equipment, some ports of the power sourcing equipment supplying power to some powered devices must be disabled so as to avoid an excess load on the remaining power sources. Furthermore, the powered devices which are not to be disabled are preferably to be shielded from any adverse effect from the failed power source. This requires rapid action in the case of power source failure, preferably by disabling sufficient ports so as to reduce the total power drawn by the connected powered device within a short time period, such as 20 milliseconds, or more preferably 2 milliseconds. Disabling sufficient ports prevents an overload condition on the remaining power sources. It is to be understood that shutting down power to a port is herein used interchangeably with disabling a powered device, since each powered device is connected to a specific port.

In prior art systems, in the event of a failure of one or more power sources, ports supplying power to powered devices are individually turned off, and the resultant overall power consumption, or overall current draw, is monitored. Once power consumption has been reduced to a level lower than the power available, the prior art algorithm ceases. Such an algorithm eventually succeeds in balancing the power consumption with the reduced available supply; however the algorithm is slow and requires multiple actual power consumption measurements. Unfortunately, during operation of the prior art algorithm, a mismatch exists between power consumption and power availability, which leads to either overheating of the remaining power sources, or a dip in the power being supplied to those powered devices that have not been disabled. Such a dip in power, which may be manifested as a reduced voltage, can negatively affect the performance of those powered devices resulting in unintended failures.

What is therefore needed, and not known in the prior art, is a method for rapidly identifying and disabling ports in the event that power consumption exceeds available power. Preferably, such an algorithm allows for stabilizing power in the event of a failure indication of one or more connected power sources in less than 20 milliseconds, even more preferably less than 2 milliseconds.

SUMMARY OF THE INVENTION

Accordingly, it is a principal object of the present invention to overcome the disadvantages of prior art. This is provided in the present invention by pre-identifying ports to which power is to be reduced in the event of a failure of any one or more of the plurality of power sources. Preferably, power consumption for each port to which power is being supplied is monitored, and a table comprising possible combinations of operating power sources, and the total available power for each of the possible combinations is maintained. For each possible combinations of operating power sources, a list of ports for which power is to be reduced is maintained, the list being based on the monitored power consumption and the total available power for the combination. In an exemplary embodiment the power reduction comprises disabling the port.

Thus, in the event of a failure of, or reduced power availability from, one or more power sources resulting in power consumption exceeding the available power, reduction of power to specific ports proceeds according to the pre-identified list. After reducing power in accordance with the pre-stored list of ports, preferably power consumption is again compared to the total available power.

The invention provides for a method for rapidly reducing power in the event of a change in power source conditions, comprising: obtaining an indicator of one of current power consumption of ports being supplied power and current power allocation of ports being supplied power; storing for at least one possible power source condition different than a current power source condition identifiers of ports being supplied power for which power is to be reduced, the identifiers being associated with the at least one power source condition; and in the event of a change in power source condition from the current power source condition to a revised power source condition; identifying the revised power source condition as one of the at least one power source condition; and reducing power to ports in accordance with the stored identifiers associated with the revised power source condition.

In one embodiment the step of reducing power to ports is accomplished by disabling the ports. In another embodiment the step of reducing power comprises one of reducing the allocated power to a pre-determined value, reducing the allocated power by a pre-determined value, reducing the power to a pre-determined value and reducing the power by a pre-determined value. In yet another embodiment the step of reducing power to ports is accomplished by setting a value to a current limiter controlling the port. In yet another embodiment the step of obtaining an indicator comprises obtaining the actual power usage of at least one port.

In one embodiment the method further comprises calculating for the at least one possible power source condition a projected excess demand, the projected excess demand being a function of the obtained indicator, the ports for which power is to be reduced being selected as a function of the projected excess demand. Preferably the calculating comprises inputting an indication of the allocated power of at least one port. Further preferably the allocated power is established by a classification. Even further preferably the classification is according to the IEEE 802.3af standard. In one further embodiment the allocated power is a user defined parameter.

In one further embodiment the step of calculating comprises inputting an indication of the current power consumption of at least one port. In another further embodiment the step of storing identifiers of ports comprises: inputting the power consumption of a lowest priority port; deducting the power consumption of the lowest priority port from the projected excess demand; and storing an identifier of the lowest priority port.

In another further embodiment the step of storing identifiers of ports comprises: inputting the power consumption of a first port; deducting the power consumption of the first port less a pre-determined value to which power is to be reduced from the projected excess demand; and storing an identifier of the first port. Preferably, the method further comprises storing an identifier of the pre-determined value associated with the identifier of the first port.

In another further embodiment the step of storing identifiers of ports comprises: inputting the allocated power of a first port; deducting the allocated power of the first port less a pre-determined value to which the allocated power will be reduced from the projected excess demand; and storing an identifier of the first port. Preferably, the method further comprises storing the predetermined value associated with the identifier of the first port.

In another further embodiment the step of storing identifiers of ports comprises: inputting the allocated power of a first port; deducting the allocated power of the first port from the projected excess demand; and storing an identifier of the first port. Preferably, the allocated power is established by a classification. Even further preferably the classification is according to the IEEE 802.3af standard. In another preferred further embodiment the allocated power is a user defined parameter.

In another embodiment the method further comprises after the step of reducing: obtaining a revised indicator of one of current power consumption of ports being supplied power and current power allocation of ports being supplied power; comparing the revised indicator to a power budget associated with the revised power source condition; and in the event that the revised indicator is greater than the power budget associated with the revised power source condition: inputting the power consumption of a first port; and reducing power to the first port to a pre-determined value. Preferably, the method further comprises in the event that the revised indicator is greater than the power budget associated with the revised power source condition: subtracting the power consumption of the first port less the pre-determined value from the revised indicator to obtain an expected value; and comparing the expected value to the power budget associated with the revised power source condition.

In another embodiment the method further comprises after the step of reducing: obtaining a revised indicator of one of current power consumption of ports being supplied power and current power allocation of ports being supplied power; comparing the revised indicator to a power budget associated with the revised power source condition; and in the event that the revised indicator is greater than the power budget associated with the revised power source condition: inputting the power consumption of a first port; and reducing power to the first port by a pre-determined value. Preferably the method further comprises in the event that the revised indicator is greater than the power budget associated with the at least one power condition: subtracting the predetermined value from the revised indicator to obtain an expected value; and comparing the expected value to the power budget associated with the at least one power condition.

In one embodiment the change in power source condition is associated with the failure of at least one power source. In another embodiment the change in power source condition is associated with a change in operating temperature of at least one power source.

Independently the invention provides for a power over Ethernet system comprising: a controller; a memory; a plurality of power sources; at least one port supplying power to an attached powered device; and a means for identifying the condition of at least one of the plurality of power sources; wherein the controller is operable to: calculate for at least one power source condition different than a current power source condition identifiers of ports for which power is to be reduced; store the identifiers of ports associated with the at least one power source condition in the memory; and in the event of a change in power source condition to the at least one power source condition reduce power to ports in accordance with the stored identifiers.

The invention independently provides for a power over Ethernet system comprising: a controller; a plurality of power sources; at least one port supplying power to an attached powered device; and a means for identifying the condition of at least one of the plurality of power sources; wherein the controller is operable to: store identifiers of ports for which power is to be reduced in the event the condition of the at least one power source is different from the current condition, the identifiers being associated with the condition; and in the event of a change in power source condition to the at least one power source condition different from the current condition, reduce power to ports in accordance with the stored identifiers.

The invention independently provides for a method of rapidly changing allocated power to ports in the event of a change in power source conditions, comprising: allocating power to at least one port in accordance with a first power source condition, the first power source condition being associated with a current power source condition; obtaining an indicator of one of current power consumption and current power allocation of the at least one port; calculating for at least one possible power source condition different than the first power source condition a projected excess demand as a function of the indicator, the excess demand being positive or negative; storing for the at least one possible power source condition identifiers of ports for which the allocated power is to be changed associated with the at least one power source condition, the ports being a function of the projected excess demand; and in the event of a change in power source condition to a second power source condition different than the first power source condition: identifying the second power source condition as one of the at least one power source condition; and changing the allocated power to ports in accordance with the stored identifiers associated with the second power source condition.

In one embodiment the step of changing the allocated power comprises increasing allocated power to the at least one port. In another embodiment the step of changing the allocated power comprises allocating power to at least port which was not power in the first power source condition.

The invention independently provides for a method for rapidly reducing power in the event of a change in power source conditions, comprising: obtaining an indicator of one of current power consumption and current power allocation of ports being supplied power; calculating for at least one possible power source condition different than a current power source condition a projected excess demand, the projected excess demand being a function of the indicator, storing for the at least one possible power source condition different than the current power source condition identifiers of ports being supplied power for which power is to be reduced, the identifiers being associated with the at least one power source condition and being a function of the projected excess demand; and in the event of a change in power source condition to a revised power source condition; identifying the revised power source condition as one of the at least one power source condition; and reducing power to ports in accordance with the stored identifiers associated with the revised power source condition.

The invention independently provides for a method for rapidly reducing power in the event of a change in power source conditions, comprising: obtaining an indicator of one of current power consumption and current power allocation of ports being supplied power; storing for at least two possible power source conditions different than the current power source condition identifiers of ports being supplied power for which power is to be reduced, the identifiers being associated with a respective one of the at least two power source conditions; and in the event of a change in power source condition to a revised current power source condition: identifying the revised current power source condition as one of the at least two power source conditions; and reducing power to ports in accordance with the stored identifiers associated with the revised current power source condition.

Additional features and advantages of the invention will become apparent from the following drawings and description.

BRIEF DESCRIPTION OF THE DRAWINGS AND TABLE

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a method for rapidly identifying and reducing power to ports in the event that power consumption exceeds power available. Preferably, such a method allows for eliminating an excess demand condition caused by a failure of, reduced power availability from, one or more connected power sources in less than 20 milliseconds, and even more preferably in less than 2 milliseconds. The invention is being particularly described in relation to a power over Ethernet system, however this is not meant to be limiting in any way. The method is equally applicable to any system in which power from a plurality of power sources is supplied to a plurality of ports, wherein at least some of the ports differ in actual or budgeted power consumption.

The invention provides for pre-identifying ports to which power is to be reduced in the event of a failure of any one or more of the plurality of power sources. Preferably, power consumption for each port to which power is being supplied is monitored, and a table comprising possible combinations of operating power sources, and the total available power for each of the possible combinations is maintained. For each possible combinations of operating power sources, a list of ports for which power is to be reduced is maintained, the list being based on the monitored power consumption and the total available power for the combination. In an exemplary embodiment the power reduction comprises disabling the port.

Thus, in the event of a failure of, or reduced power availability from, one or more power sources resulting in power consumption exceeding the available power, reduction of power to specific ports proceeds according to the pre-identified list. After reducing power in accordance with the pre-stored list of ports, preferably power consumption is again compared to the total available power.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1A:
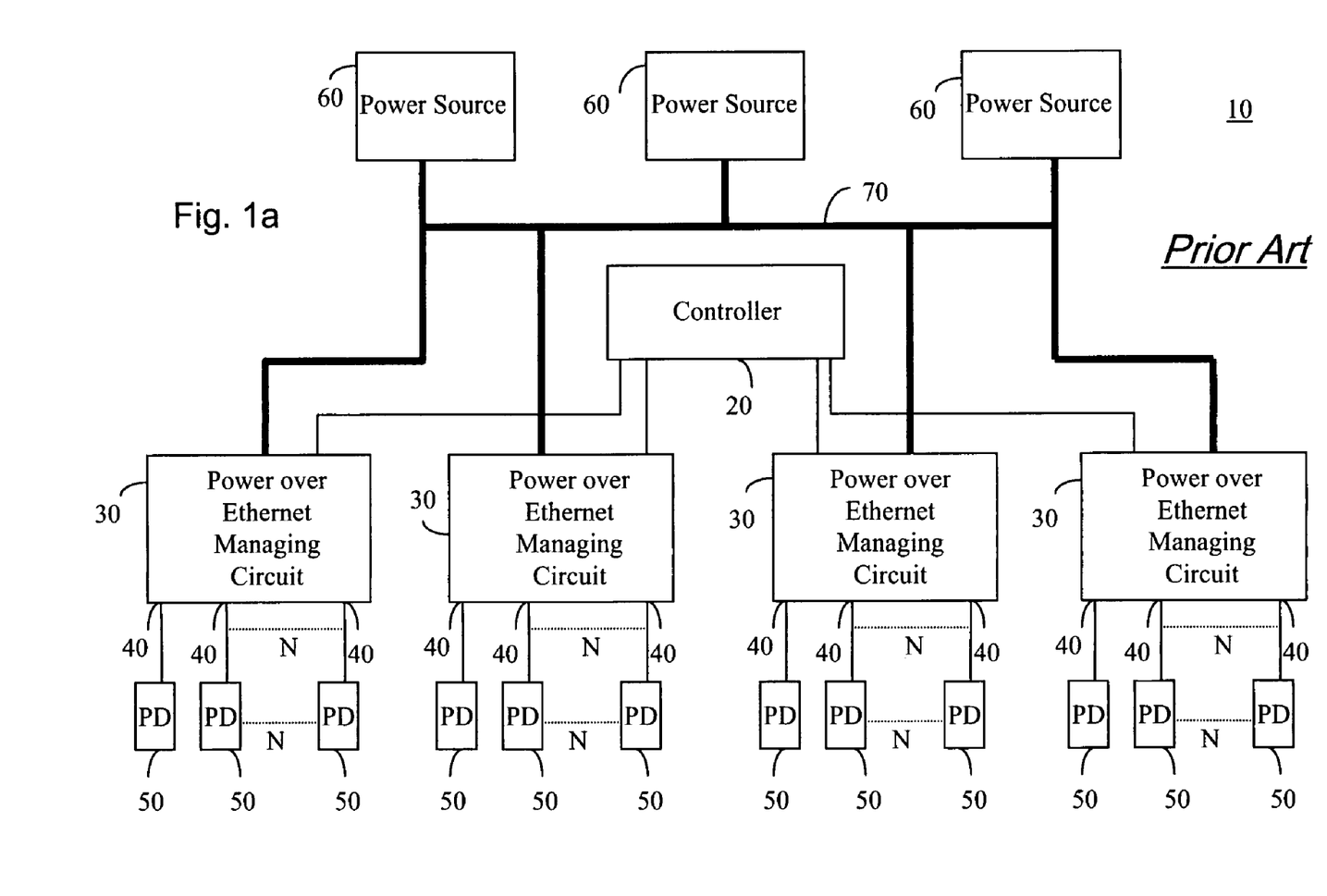
FIG. 1a is a high level block diagram of a power over Ethernet system, known to the prior art, serving a plurality of ports and comprising a plurality of power sources.

FIG. 1a is a high level block diagram of a power over Ethernet system 10 known to the prior art serving a plurality of ports and comprising a plurality of power sources. Power over Ethernet system 10 comprises controller 20; a plurality of power over Ethernet managing circuits 30 each exhibiting a plurality of ports 40; a plurality of powered devices (PD) 50; a plurality of power sources 60; and a common power bus 70. Controller 20 is in communication with each of the power over Ethernet managing circuits 30, and each power over Ethernet managing circuit 30 has connected thereto, through a port 40, a powered device 50. Each power over Ethernet managing circuit 30 typically has a plurality of ports 40, and for each port 40 a respective PD 50 is connected to receive power over structured communication cabling. Power sources 60 are connected in parallel to feed power to common power bus 70, and power bus 70 supplies power to each power over Ethernet managing circuit 30.

In one embodiment power sources 60 are connected in a "wired or" arrangement, and power is shared using inherent droop characteristics of the power sources. In another embodiment, one power source 60 acts as a reserve, or back-up unit, supplying power only in the event of a failure of one or more of the operating power sources 60. In yet another embodiment, the plurality of power sources 60 are connected to share power among them, thus feeding a total overall power to common power bus 70.

In operation, controller 20 supplies overall control information to each of the connected power over Ethernet managing circuits 30. Power over Ethernet managing circuits 30 receive power from common power bus 70, and supply power at output ports 40 over structured communication cabling, to connected PDs 50. In a preferred embodiment power is supplied in accordance with IEEE 802.3af-2003 standard, whose entire contents are incorporated herein by reference, over structured communication cabling. Based on the total power available via common power bus 70 power over Ethernet managing circuits 30, in communication with controller 20, are operative to supply power over ports 40 to PDs 50.

Figure 2:
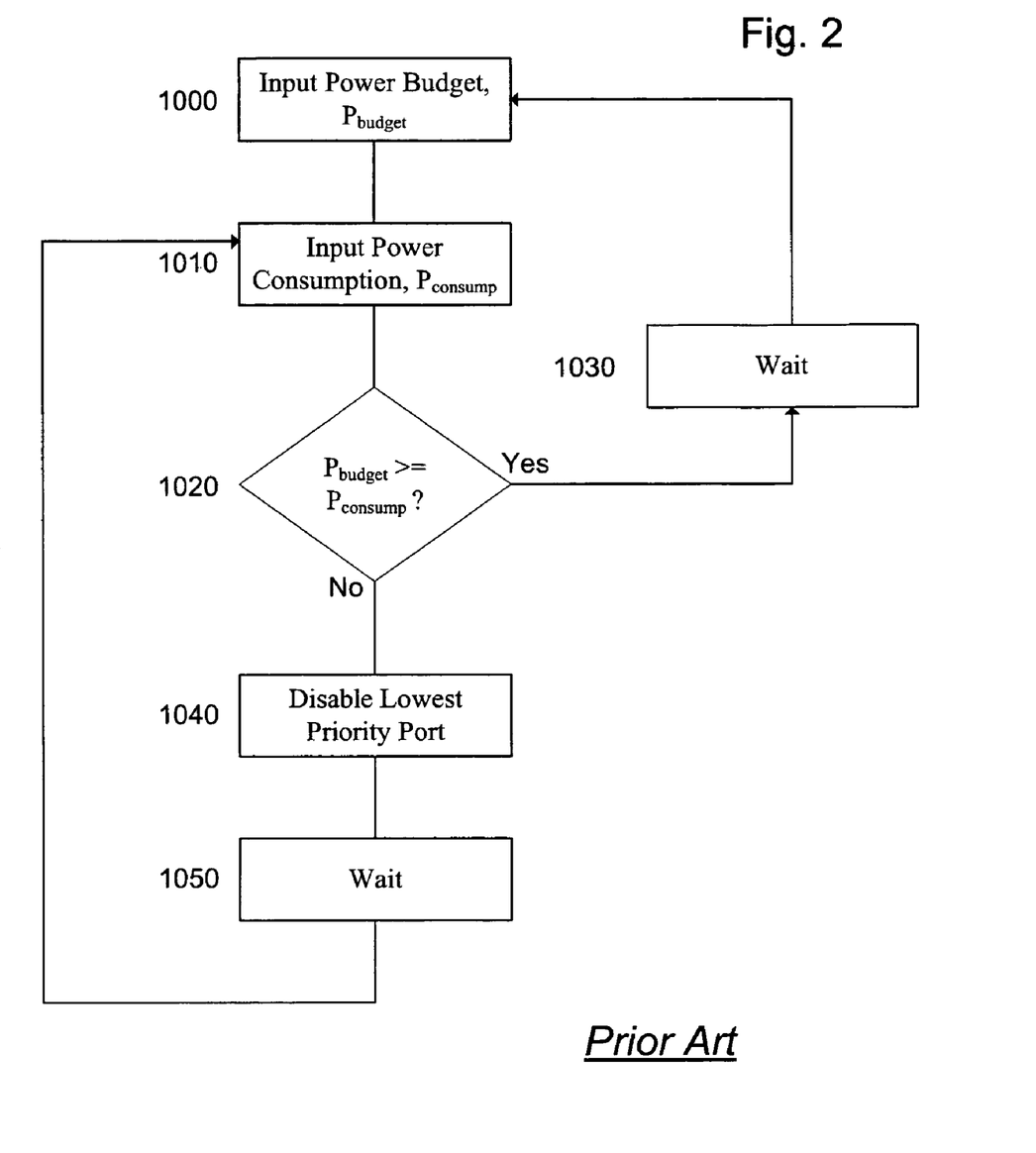
FIG. 2 is a high level flow chart of the operation of the controller of FIG. 1a according to a method known to the prior art in the event of an excess power demand.

FIG. 2 is a high level flow chart of the operation of controller 20 of FIG. 1a according to a method known to the prior art in the event of an excess power demand, which may be caused by a failure of one or more of the plurality of power sources 60. An excess power demand is defined as any situation in which the total power consumption of the connected PDs 50 exceeds the power budget available. In one embodiment, the power budget is the sum total of the rating of power sources 60, less any power consumption of controller 20 and power over Ethernet managing circuits 30.

In step 1000, the total power budget, designated $P_{budget}$, is input. In one embodiment, $P_{budget}$ input to controller 20 is a function of the total rated output of the connected power sources 60. In step 1010, an indicator of the total power consumption of enabled ports 40 of the attached power over Ethernet managing circuits 30 is input, and designated $P_{consump}$. $P_{consmup}$ represents the total power consumption of the PDs 50, with the data being supplied from the individual power over Ethernet managing circuits 30. In step 1020, $P_{budget}$ is compared with $P_{consump}$. In the event that $P_{budget}$ is greater than or equal to $P_{consump}$, i.e. power being drawn is within budget, in step 1030 a wait step is inserted. After a pre-set interval step 1000 is again executed. Thus the relationship between $P_{budget}$ and $P_{consump}$ is compared on a polling basis at regular intervals.

In the event that in step 1020 $P_{budget}$ is not greater than or equal to $P_{consump}$, i.e. an excess power demand condition exists, in step 1040 the lowest priority port currently receiving power is disabled. Disabling a port stops the flow of power over the communication cabling to the attached PD 50. It is it to be understood that priority is assigned to each port based on either its location or other management criteria. Such a priority assignment is not a requirement, and simply serves to ensure that an orderly decision is made as to which port to disable. In one embodiment, priority is assigned based solely on physical port number, with a higher number port being assigned a lower priority than a lower number port. In another embodiment, priority includes an assignment of a higher priority at installation, with all ports having an assigned particular priority being further prioritized by port number.

In step 1050, a wait step is inserted. Wait step 1050 is of a duration sufficient to allow for stabilization of $P_{consump}$ after the disabling of the lowest priority port in step 1040. After wait step 1050, step 1010 is again executed as described above, and in this manner the excess power demand condition is resolved.

Figure 1B:
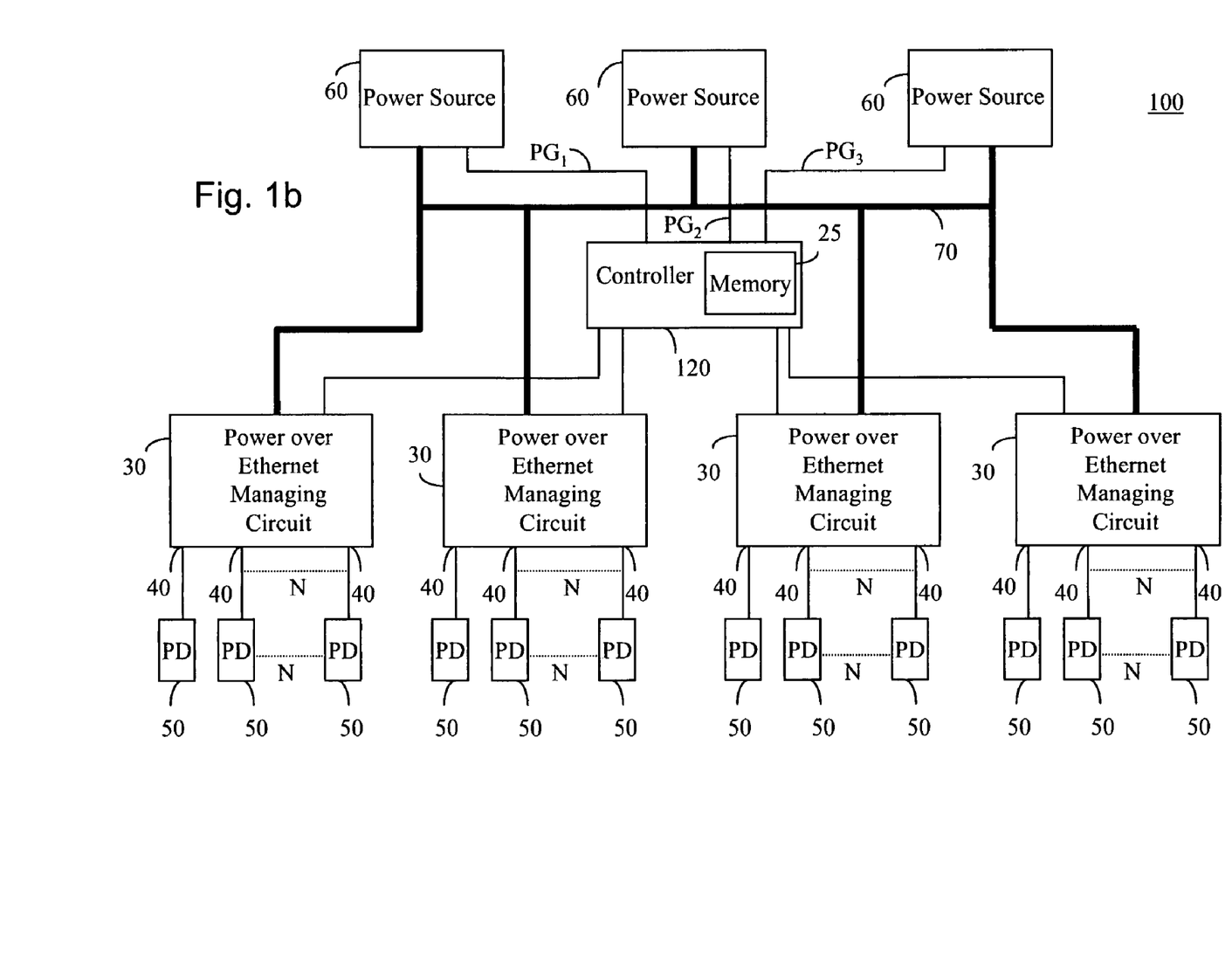
FIG. 1b is a high level block diagram of a power over Ethernet system, in accordance with the principle of the invention, serving a plurality of ports and comprising a plurality of power sources, each power source having a status indicator in communication with a controller.

FIG. 1b is a high level block diagram of a power over Ethernet system 100, in accordance with the principle of the invention, serving a plurality of ports and comprising a plurality of power sources 60, each power source 60 having a status indicator, depicted generally as PG, in communication with a controller 120. In particular, power over Ethernet system 100 comprises controller 120 having associated therewith a memory 25; a plurality of power over Ethernet managing circuits 30 exhibiting a plurality of ports 40; a plurality of PDs 50; first, second and third power sources 60; a common power bus 70; and status indicators $PG_1$, $PG_2$ and $PG_3$. Controller 120 is in communication with each of the power over Ethernet managing circuits 30, and each power over Ethernet managing circuit 30 has connected thereto, through a port 40, a PD 50. Each power over Ethernet managing circuit 30 typically has a plurality of ports 40, and for each port 40 a PD 50 is connected to receive power over structured communication cabling. Power sources 60 are connected in parallel to feed power to common power bus 70, and power bus 70 supplies power to each power over Ethernet managing circuit 30.

In one embodiment power sources 60 are connected in a "wired or" arrangement, and power is shared using inherent droop characteristics of the power sources. In another embodiment, one power source 60 acts as a reserve, or back-up unit, supplying power only in the event of a failure of one or more of the operating power sources 60. In yet another embodiment, the plurality of power sources 60 are connected to share power among them, thus feeding a total overall power to common power bus 70.

Status indicator $PG_1$ communicates the status of first power source 60 to controller 120, status indicator $PG_2$ communicates the status of second power source 60 to controller 120 and status indicator $PG_3$ communicates the status of third power source 60 to controller 120. First second and third power sources 60 are shown, each having an associated status indicator, $PG_1$, $PG_2$ and $PG_3$, respectively, however this is not meant to be limiting in any way. More or less than three power sources may be connected without exceeding the scope of the invention. Similarly, a unique status indicator, PG, is shown for each power source 60, however this is not meant to be limiting in any way. Any other means, such as a comparator circuit, a means for manual intervention, a timing circuit or an overall system control which is sufficient to notify controller 120 of an updated power budget is specifically included herewith. In one embodiment the power budget is the power rating of each power source indicating a good status indicator PG. In another embodiment, a safety factor is added, thus reducing the total available power budget to less than the total of the ratings of power sources 60. In yet another embodiment, controller 120 monitors the condition of power bus 70 to detect an available power budget. In yet another embodiment, controller 120 is in communication with each power source 60 to monitor its availability, and other factors such as temperature. In an exemplary embodiment, responsive to an increase in temperature of a power source 60, the power budget portion associated with the elevated temperature power source 60 is reduced.

In operation, power over Ethernet system 100 operates in all respects similarly to that described above with respect to power over Ethernet system 10 of FIG. 1a; with the added feature of controller 120 being specifically notified of a change in available power or power budget from each power source 60 through the associated status indicator PG. In a preferred embodiment, the change in power budget is signaled by an interrupt as a result of a change in status indicator PG to controller 120 upon change of operating status of any one or more of the connected power sources 60.

Figure 3:
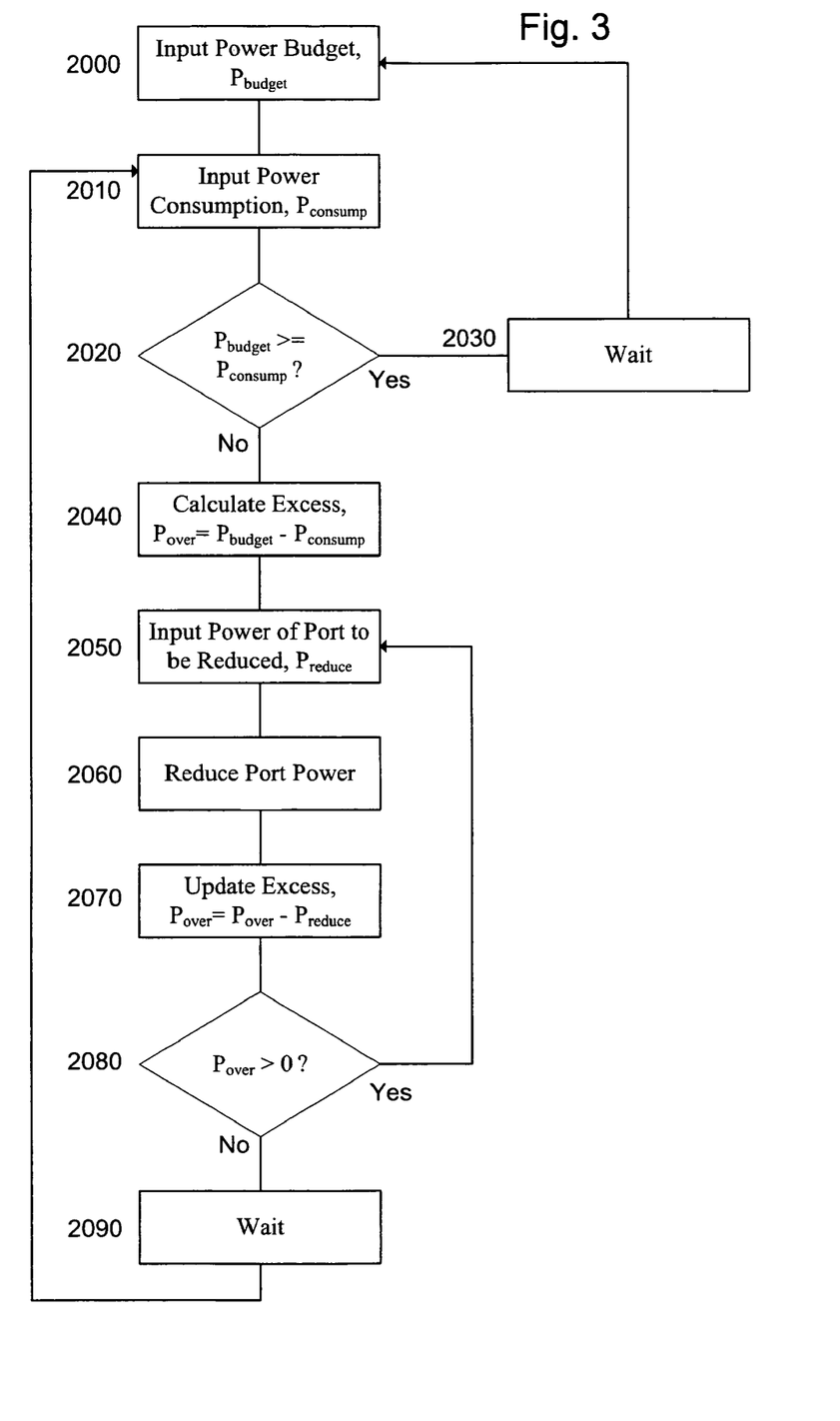
FIG. 3 is a high level flow chart of the operation of the controller of FIG. 1b in the event of detection of excess power demand according to an aspect of the invention.

FIG. 3 is a high level flow chart of the operation of controller 120 of FIG. 1b in the event of detection of excess power demand according to an aspect of the invention. An excess power demand is defined as any situation in which the power consumption of the connected PDs 50 exceeds the available power budget. In one embodiment, the power budget is the sum total of the rating of power sources 60, less any power consumption of controller 120 and power over Ethernet managing circuits 30. In another embodiment, a safety factor is added, thus reducing the total available power budget to less than the sum of the rating of power sources 60. The total power available may be dynamically modified by temperature or other considerations. In a preferred embodiment, controller 120 is in communication with each power source 60 to monitor its availability and current status through a respective status indicator PG.

In step 2000, the total power budget, designated $P_{budget}$, is input. In one embodiment, as described above, $P_{budget}$ is a function of the total rated output of the connected power sources 60. In another embodiment, $P_{budget}$ is updated based on communication with the connected power sources, and is updated in response to a status indicator. In yet another embodiment, a monitoring circuit (not shown) communicates a status indicator for at least one power source 60, and $P_{budget}$ is calculated and updated based on the received status indicator.

In step 2010, the power consumption through active ports 40 of the attached power over Ethernet managing circuits 30 is input, and designated $P_{consump}$. $P_{consump}$ represents the total power consumption of the PDs 50. In an exemplary embodiment each power over Ethernet managing circuits 30 provides a total power consumption of all ports 40 associated therewith. In step 2020, $P_{budget}$ is compared with $P_{consump}$. In the event that $P_{budget}$ is greater than or equal to $P_{consump}$, i.e. power being drawn is within budget, in step 2030 a wait step is inserted. After a pre-set interval step 2000 is again executed. Thus the relationship between $P_{budget}$ and $P_{consump}$ is compared on a polling basis at regular intervals.

In the event that in step 2020 $P_{budget}$ is not greater than or equal to $P_{consump}$, i.e. an excess power demand condition exists, in step 2040 the excess power demand quantity, designated $P_{over}$, is calculated as:

$$P_{over} = P_{budget} - P_{consump} \qquad \text{Equation 1}$$

In step 2050, the power consumption of the lowest priority port currently receiving power, designated $P_{reduce}$, is input. In an exemplary embodiment this is accomplished by controller 120 reading an appropriate register in the power over Ethernet managing circuit 30 associated with a lowest priority port 40. In step 2060, power to the lowest priority port 40 identified in step 2050 is reduced. In an exemplary embodiment the lowest priority port 40 is disabled. In another embodiment, the power allocated to the lowest priority port 40 is reduced to a pre-determined value, preferably by setting a revised value to a current limiter controlling the port. In yet another embodiment the power allocated to the lowest priority port is reduced by a pre-determined value. In yet another embodiment the port power of the lowest priority port is reduced to a pre-determined value or reduced by a pre-determined value. In a preferred embodiment, controller 120 sends a power reduction instruction to a specific power over Ethernet managing circuit 30, with instructions to reduce power to a specific port.

In step 2070, the excess power demand quantity is updated to reflect the assumed reduced power by the operation of step 2060 as:

$$P_{over} = P_{over} - P_{reduce} \qquad \text{Equation 2}$$

It is to be understood, that in the embodiment in which power allocated to the lowest priority port is not disabled but instead reduced to a pre-determined amount, $P_{reduce}$ comprises the actual power consumption, or allocation, of the lowest priority port less the pre-determined value to which the power, or allocation, respectively, will be reduced. Similarly in the event the power consumption or allocation is reduced by a pre-determined value, $P_{reduce}$ comprise the pre-determined value. In step 2080, the updated $P_{over}$ calculated according to Equation 2 is compared with zero. If the updated $P_{over}$ is greater than zero, then an excess power demand condition is still expected, and step 2050, as described above, is executed resulting in the reduction of power to one or more additional ports.

In the event that in step 2080, the updated $P_{over}$ is not greater than zero, i.e. no excess power demand condition is expected, wait state 2090 is executed. Wait state 2090 is of a sufficient duration to allow $P_{consump}$ to stabilize after the reduction of power allocated to the lowest priority port in step 2060. In an exemplary embodiment wait state 2090 is inherent in the operation of controller 120 is not a separate wait state. Then step 2010 as described above is executed, inputting the actual measured power consumption, $P_{consump}$, and in step 2020 comparing it with $P_{budget}$.

The operation of FIG. 3 is thus improved as compared with the prior art method of FIG. 2, as the excess power demand is removed through a calculated anticipated result, without waiting for stabilization. Thus, the excess power demand is resolved with a significantly reduced delay, as compared to the method of the prior art.

The operation of FIG. 3, has been described as utilizing the actual consumption of the port to be disabled, $P_{reduce}$. This is not meant to be limiting in any way, and is specifically meant to include the use of the allocated power of the port to be disabled as $P_{reduce}$, without exceeding the scope of the invention. In an exemplary embodiment, the allocated power of the port to be disabled is established by classification according to the IEEE 802.3af-2003 standard. It yet another embodiment the allocated power is an optional user defined parameter.

The overall power consumption has been described as utilizing the actual power consumption $P_{consump}$. This is not meant to be limiting in any way, and is specifically meant to include the use of total allocated power, or a combination of total allocated power and actual power consumption as $P_{consump}$, without exceeding the scope of the invention.

Figure 4:
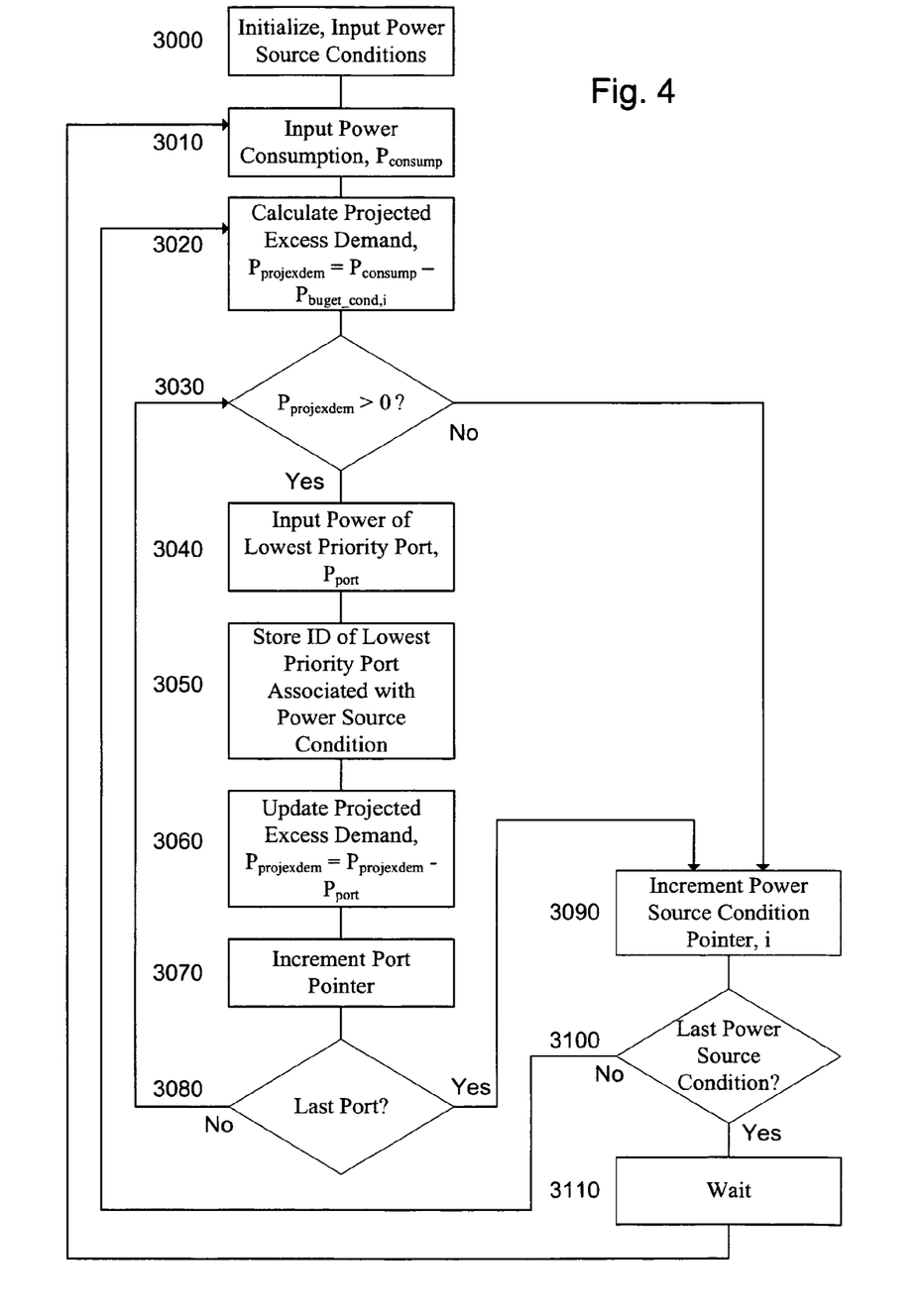
FIG. 4 is a high level flow chart of the operation of the controller of FIG. 1b to produce a projected port power reduction table in accordance with the principle of the invention.

FIG. 4 is a high level flow chart of the operation of controller 120 of FIG. 1b to produce a projected port reduction table preferably stored in memory 25. Controller 120 operates on a polling cycle in a manner to be described below, to produce a projected port reduction table for each potential power source condition.

In step 3000, the routine is initialized, including inputting all possible combinations of power source conditions, designated as index "i", and the power budget available for each condition, designated generally as $P_{budget\_cond,i}$. In an exemplary embodiment, each potential combination of power from first, second and third power sources 60, represents a power source condition. A power source condition pointer is initialized; the listing of enabled ports according to priority is input; and a port pointer is initialized to the lowest priority port currently enabled. In one embodiment, additional power source conditions include an increased operating temperature for one or more of the power sources 60.

In step 3010, the total power consumption through ports 40 of the attached power over Ethernet managing circuits 30 is input, and designated $P_{consump}$. The overall power consumption is described herein as utilizing the actual power consumption for $P_{consump}$. This is not meant to be limiting in any way, and is specifically meant to include the use of total allocated power, or a combination of total allocated power and actual power consumption as $P_{consum}$, without exceeding the scope of the invention.

In step 3020, the projected excess demand, equivalent to the difference between $P_{consump}$ and $P_{budget\_cond,i}$ for the current power source condition pointer, "i", and designated as $P_{projexdem}$, is calculated as:

$$P_{projexdem} = P_{consump} - P_{budget\_cond,i} \qquad \text{Equation 3}$$

$P_{projexdem}$ thus represents a projected excess power demand.

In step 3030, $P_{projexdem}$ calculated in step 3020 is compared with zero. In the event that $P_{projexdem}$ is greater than zero, i.e. for the current power source condition pointer an excess demand is projected, in step 3040 the actual power consumption, designated $P_{port}$, of the lowest priority enabled port in the port list, as identified by the port pointer, is input.

The above has been described as utilizing the actual consumption of the port for $P_{port}$. This is not meant to be limiting in any way, and is specifically meant to include the use of the allocated power of the port as $P_{port}$, without exceeding the scope of the invention. In an exemplary embodiment, the allocated power of the port is established by a classification according to the IEEE 802.3af-2003 standard. It yet another embodiment the allocated power is an optional user defined parameter.

In step 3050, an identifier for the lowest priority port that was input in step 3040 is stored associated with the current power source condition pointer, "i". Storing the identifier associated with the current power source condition pointer, enables controller 120, as will be described further below, to rapidly disable pre-identified ports in the event of a change in the power source condition. In one embodiment, the identifier of the lowest priority port is stored further associated with a reduced power allocation amount. In yet another embodiment the lowest priority port is stored further associated with a reduced power pre-determined value or a pre-determined reduction value. Preferably, the identifier is stored in memory 25 associated with controller 120.

In step 3060, $P_{projexdem}$ is updated to account for $P_{port}$ of the port whose identifier was stored in step 3050, as:

$$P_{projexdem} = P_{projexdem} - P_{port} \qquad \text{Equation 4}$$

In an embodiment in which the lowest priority port is not to be disabled, but instead is to have its power or allocation reduced to a pre-determined value, $P_{port}$ in equation 4 is replaced with $P_{port}$ less the pre-determined value to which power is to be reduced. In an embodiment in with the lowest priority port is to have its power or allocation reduced by a pre-determined value, $P_{port}$ in equation 4 is replaced with the pre-determined value.

In step 3070, the port pointer is incremented to the next lowest priority enabled port in the port list. In step 3080, the port pointer is compared with a last port pointer indicator. In the event that the last enabled port has been utilized, in step 3090, the power source condition pointer "i" is incremented. In step 3100 the power source condition pointer, "i" is compared with a last power source condition indicator. In the event that the last power source condition has been utilized, in the step 3110 a wait step is inserted. After a pre-set interval, step 3010 is again executed. Thus power consumption is again input, and in step 3020 $P_{projexdem}$ is calculated and evaluated on a continual, regular basis. In the event that in step 3100 the last power source condition has not been utilized, step 3020 is again executed. In the event that in step 3080 the last enabled port has not been utilized, step 3030 is again executed.

In the event that in step 3030, $P_{projexdem}$ is not greater than zero, i.e. power need not be reduced to any ports to achieve the power budget of the current power source condition pointer, in step 3090 the power source condition pointer is incremented as described above.

Table I is a graphical representation of an embodiment of the projected port power reduction table produced as an outcome of the method of FIG. 4 and preferably stored in memory 25. The first column represents the condition of the first power source 60, as indicated by $PG_1$. The second column represents the condition of the second power source 60, as indicated by $PG_2$. The third column represents the condition of the third power source 60, as indicated by $PG_3$. A value of 1 is indicative that full rated power is available from the associated power source and a 0 value is indicated that no power is available from the associated power source.

The possible combinations of $PG_1$, $PG_2$, and $PG_3$ thus represent an address selection on the table. The fourth column represents the total power budget available for each power source condition identified in the first three columns, identified as $P_{budget\_cond}$. The fifth column comprises a list of ports for which power is to be reduced in the event that the power source condition changes from the current power source condition to that represented by the combination of $PG_1$, $PG_2$ and $PG_3$ of the present row.

TABLE I

| $PG_1$ | $PG_2$ | $PG_3$ | $P_{budget\_cond}$ | Identification of Ports to be disconnected |
|---|---|---|---|---|
| 0 | 0 | 0 | 0 Watts | NA-No power available |
| 0 | 0 | 1 | 250 Watts | Port 0; Port 1; Ports 10-48 |
| 0 | 1 | 0 | 300 Watts | Port 0; Port 1; Ports 20-48 |
| 0 | 1 | 1 | 550 Watts | Port 0; Port 1; Port 32-48 |
| 1 | 0 | 0 | 400 Watts | Port 0; Port 1; Ports 25-48 |
| 1 | 0 | 1 | 650 Watts | Port 0; Port 1; Ports 40-48 |
| 1 | 1 | 0 | 700 Watts | Port 0; Port 1 |
| 1 | 1 | 1 | 950 Watts | NA-Full power available-Current Condition |

Table I thus illustrates an exemplary embodiment in which all ports for which power is to be reduced have their power reduced to a single pre-determined value. In the exemplary embodiment the value is zero, and the ports are intended to be disabled. This is not meant to be limiting in any way. A plurality of values may be assigned, with different ports being assigned different reduced power values without exceeding the scope of the invention. Preferably, if a plurality of values is utilized, the values are stored in the table associated with the appropriate ports.

The implementation of Table I enables a pre-planned power reduction to ports in the event that any change to the power source condition occurs. The table is updated regularly according to the method of FIG. 4, and represents a list of ports for which power reduction is to occur in the event that the power source condition changes from the current power source condition, to any other condition.

Table I is presented with each power source having either a 0 or 1 condition, i.e. it is either fully available or completely unavailable. This is meant by way of illustration only, and is not meant to be limiting in any way. In particular the use of a plurality of conditions and power budgets from each power source is specifically included. In one embodiment an input from each power source responsive to a power representing signal of the power source, the input having a plurality of values, is used as an address.

Figure 5:
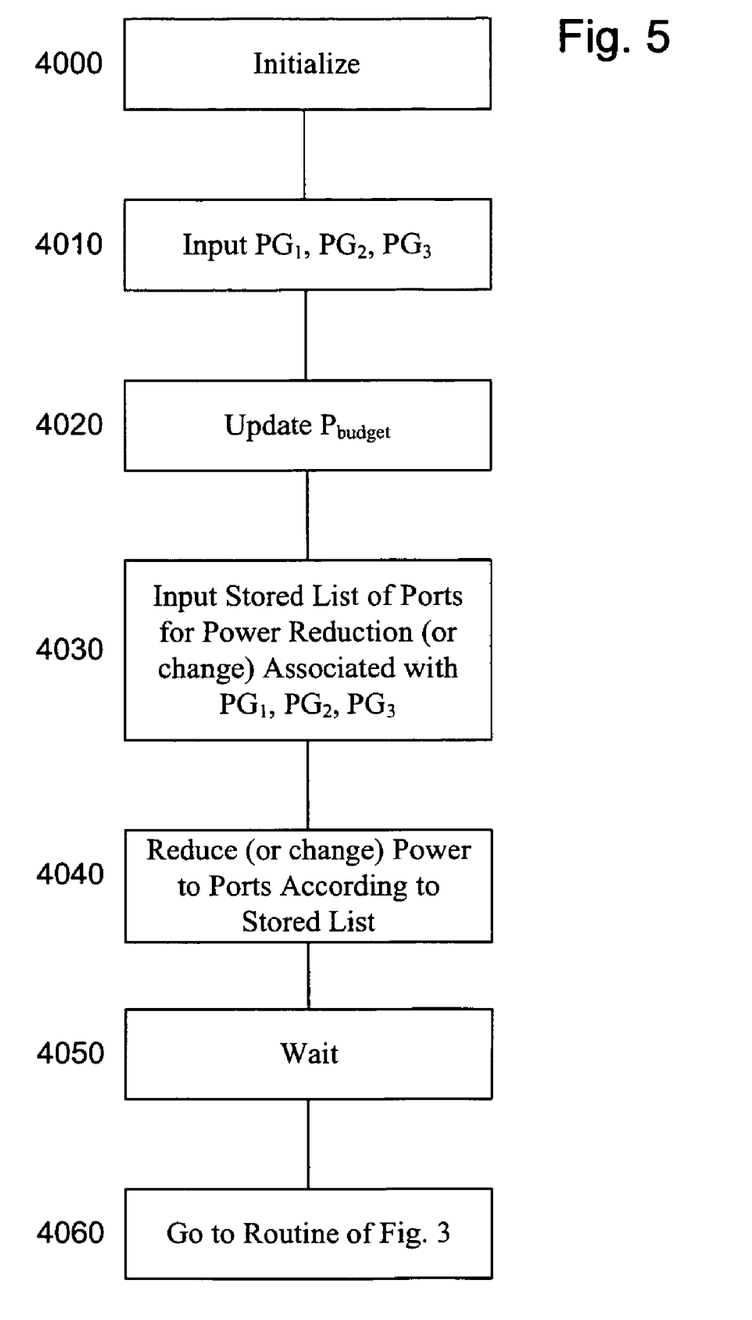
FIG. 5 is a high level flow chart of the operation of the controller of FIG. 1b, in accordance with the principle of the invention, in the event of a change in power condition associated with one or more power sources; and Table I is a representation of an embodiment of the projected port power reduction table produced as an outcome of the method of FIG. 4 in accordance with the principle of the invention.

FIG. 5 is a high level flow chart of the operation of the controller of FIG. 1b is the event of a failure of one or more power sources 60. FIG. 6 is typically called in response to an interrupt, the interrupt condition being a change of any one of $PG_1$, $PG_2$ and $PG_3$. The above is not meant to be limiting in any way, and other interrupt conditions and power source conditions are specifically to be included without exceeding the scope of the invention. In one embodiment an increased operating temperature of one or more of the power sources 60 may trigger an interrupt, and a different value for $P_{budget\_cond}$ of FIG. 4 and Table I is utilized in the event of an increased operating temperature.

In step 4000 the routine is initialized, and in step 4010, the current condition of $PG_1$, $PG_2$ and $PG_3$ is input. In step 4020, $P_{budget}$ is updated to be equal to $P_{budget\_cond}$ of the current condition. In an alternative embodiment, $P_{budget}$ is obtained from Table I using $PG_1$, $PG_2$ and $PG_3$ as an address. In step 4030, $PG_1$, $PG_2$ and $PG_3$ are used as the address to input from Table I the stored list of pre-selected ports to which power is to be reduced. In step 4040 power to the ports input in step 4030 is reduced in accordance with the stored list retrieved in step 4030. In a preferred embodiment, controller 120 sends specific instruction to specific power over Ethernet managing circuits 30, to reduce power to specific ports. In one embodiment, power is reduced to zero by disabling the port. In another embodiment, power is reduced to a pre-determined value, and the value is sent to the specific power over Ethernet managing circuit 30. In yet another embodiment, the reduced power value is pre-stored by the power over Ethernet managing circuit 30, and upon receipt of a reduce power instruction this value is loaded. Reduced power is preferably achieved by setting a value to a variable current limiter controlling output power to the port.

It is to be noted that the actions of steps 4000 to 4040 achieve a reduction of power to sufficient ports projected to eliminate an excess demand condition in the event of a change in condition of available power sources 60 within a very short period of time. In an exemplary embodiment, the time required is primarily a function of the time to transmit multiple requests from controller 120 to power over Ethernet managing circuits 30. In an exemplary embodiment, implemented with 48 ports, and a speed of communication between controller 120 and power over Ethernet managing circuits 30 of approximately 1.2 mHz, ports are disabled in under 400 microseconds from the interrupt request.

The above has been described in relation to having to reduce power to ports. This is not meant to be limiting in any way. In particular, in steps 4030 and 4040 in the event of an increase in power availability, power to ports may be increased. In an exemplary embodiment power may be allocated to previously unpowered ports in accordance with a pre-stored list.

In step 4050, a wait step is executed. The length of wait step 4050 is set to be sufficient to allow for actual power consumption, $P_{consump}$, to stabilize after completion of the power reduction of step 4040. In an exemplary embodiment wait state 4050 is inherent in the operation of controller 120 is not a separate wait state. In step 4060 the routine of FIG. 3, as described above is run. The routine of FIG. 3 compares the actual power consumption, $P_{consump}$ to the power budget, $P_{budget}$. Any excess power demand is disabled, one port at a time. The routine of FIG. 3, thus acts as a fine tuning of the high speed power reduction of step 4040.

Thus, the present embodiments enable pre-identifying ports to which power is to be reduced in the event of a failure of any one or more of the plurality of power sources. Preferably, power consumption for each port to which power is being supplied is monitored, and a table comprising possible combinations of operating power sources, and the total available power for each of the possible combinations is maintained. For each possible combinations of operating power sources, a list of ports for which power is to be reduced is maintained, the list being based on the monitored power consumption and the total available power for the combination. In an exemplary embodiment the power reduction comprises disabling the port.

Thus, in the event of a failure of, or reduced power availability from, one or more power sources resulting in power consumption exceeding the available power, reduction of power to specific ports proceeds according to the pre-identified list. After reducing power in accordance with the pre-stored list of ports, preferably power consumption is again compared to the total available power. Preferably, such an algorithm allows for stabilizing power in the event of a failure indication of one or more connected power sources in less than 20 milliseconds, and even further preferably in less than 2 milliseconds.

The invention has been described in relation to reducing power to pre-calculated ports in the event of a reduced power condition. This is not meant to be limiting in any way. The invention is equally applicable to an increased power condition, in which an increase in power becomes available. In this situation, power is rapidly increased to ports according to a pre-calculated list.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method for rapidly reducing power in the event of a change in power source conditions, comprising:
   obtaining an indicator of one of current power consumption of ports being supplied power and current power allocation of ports being supplied power;
   storing, for at least one possible power source condition different than a current power source condition, identifiers of ports being supplied power for which power is to be reduced, said identifiers being associated with said at least one power source condition different than said current power source condition; and
   in the event of a change in power source condition from said current power source condition to a revised power source condition:
   identifying said revised power source condition as one of said at least one power source condition; and
   reducing power to ports in accordance with said stored identifiers associated with said revised power source condition.

2. A method according to claim 1, wherein said reducing power to ports is accomplished by disabling said ports.

3. A method according to claim 1, wherein said reducing power comprises one of reducing the allocated power to a pre-determined value, reducing the allocated power by a pre-determined value, reducing the power consumption to a pre-determined value and reducing the power consumption by a pre-determined value.

4. A method according to claim 1, wherein said reducing power to ports is accomplished by setting a value to a current limiter controlling said port.

5. A method according to claim 1, wherein said obtaining an indicator comprises obtaining the actual power usage of at least one port.

6. A method according to claim 1, further comprising:
   calculating, for said at least one possible power source condition, a projected excess demand, said projected excess demand being a function of said obtained indicator,
   said ports for which power is to be reduced being selected as a function of said projected excess demand.

7. A method according to claim 6, wherein said calculating comprises inputting an indication of the allocated power of at least one port.

8. A method according to claim 7, wherein said allocated power is established by a classification.

9. A method according to claim 8, wherein said classification is according to the IEEE 802.3af-2003 standard.

10. A method according to claim 7, wherein said allocated power is a user defined parameter.

11. A method according to claim 6, wherein said calculating comprises inputting an indication of the current power consumption of at least one port.

12. A method according to claim 6, wherein said storing identifiers of ports comprises:
   inputting the power consumption of a lowest priority port;
   deducting the power consumption of said lowest priority port from said projected excess demand; and
   storing an identifier of said lowest priority port.

13. A method according to claim 6, wherein said storing identifiers of ports comprises:
   inputting the power consumption of a first port;
   deducting the power consumption of said first port less a pre-determined value to which power is to be reduced from said projected excess demand; and
   storing an identifier of said first port.

14. A method according to claim 13, further comprising storing an identifier of said pre-determined value associated with said identifier of said first port.

15. A method according to claim 6, wherein said storing identifiers of ports comprises:
   inputting the allocated power of a first port;
   deducting the allocated power of said first port less a pre-determined value to which the allocated power will be reduced from said projected excess demand; and
   storing an identifier of said first port.

16. A method according to claim 15, further comprising storing said pre-determined value associated with said identifier of said first port.

17. A method according to claim 6, wherein said storing identifiers of ports comprises:
   inputting the allocated power of a first port;
   deducting the allocated power of said first port from said projected excess demand; and
   storing an identifier of said first port.

18. A method according to claim 17, wherein said allocated power is established by a classification.

19. A method according to claim 18, wherein said classification is according to the IEEE 802.3af-2003 standard.

20. A method according to claim 17, wherein said allocated power is a user defined parameter.

21. A method according to claim 1, further comprising after said reducing:

obtaining a revised indicator of one of current power consumption of ports being supplied power and current power allocation of ports being supplied power;

comparing the revised indicator to a power budget associated with said revised power source condition; and in the event that said revised indicator is greater than said power budget associated with said revised power source condition:

inputting the power consumption of a first port; and reducing power to said first port to a pre-determined value.

22. A method according to claim 21, further comprising in the event that said revised indicator is greater than said power budget associated with said revised power source condition:

subtracting said power consumption of said first port less said pre-determined value from said revised indicator to obtain an expected value; and comparing said expected value to said power budget associated with said revised power source condition.

23. A method according to claim 1, further comprising after said reducing:

obtaining a revised indicator of one of current power consumption of ports being supplied power and current power allocation of ports being supplied power;

comparing the revised indicator to a power budget associated with said revised power source condition; and in the event that said revised indicator is greater than said power budget associated with said revised power source condition:

inputting the power consumption of a first port; and reducing power to said first port by a pre-determined value.

24. A method according to claim 23, further comprising in the event that said revised indicator is greater than said power budget associated with said at least one power condition:

subtracting said pre-determined value from said revised indicator to obtain an expected value; and comparing said expected value to said power budget associated with said at least one power condition.

25. A method according to claim 1, wherein said change in power source condition is associated with the failure of at least one power source.

26. A method according to claim 1, wherein said change in power source condition is associated with a change in operating temperature of at least one power source.

27. A power over Ethernet system comprising:

a controller;

a memory;

a plurality of power sources;

at least one port supplying power to an attached powered device, said power being received from said plurality of power sources; and a means for identifying the condition of at least one of said plurality of power sources, wherein said controller is operative to:

calculate, for at least one power source condition different than a current power source condition, identifiers of ports for which power is to be reduced;

store said identifiers of ports associated with said at least one power source condition in said memory; and in the event of a change in power source condition to said at least one power source condition different that said current power source condition, reduce power to ports in accordance with said stored identifiers.

28. A power over Ethernet system comprising:

a controller;

a plurality of power sources;

at least one port supplying power to an attached powered device, said supplied power being sourced from said plurality of power sources; and a means for identifying the condition of at least one of said plurality of power sources, wherein said controller is operative to:

store identifiers of ports for which power is to be reduced in the event said condition of said at least one power source is different from the current condition, said identifiers being associated with said condition; and in the event of a change in power source condition to said at least one power source condition different from the current condition, reduce power to ports in accordance with said stored identifiers.

29. A method of rapidly changing allocated power to ports in the event of a change in power source conditions, comprising:

allocating power to at least one port in accordance with a first power source condition, said first power source condition being associated with a current power source condition;

obtaining an indicator of one of current power consumption and current power allocation of said at least one port;

calculating, for at least one possible power source condition different than said first power source condition, a projected excess demand as a function of said obtained indicator, said excess demand being positive or negative;

storing, for said at least one possible power source condition, identifiers of ports for which said allocated power is to be changed, said identifiers associated with said at least one power source condition, said ports being a function of said projected excess demand; and in the event of a change in power source condition to a second power source condition different from said first power source condition:

identifying said second power source condition as one of said at least one power source condition; and changing said allocated power to ports in accordance with said stored identifiers associated with said second power source condition.

30. The method of claim 29, wherein said changing said allocated power comprises increasing allocated power to said at least one port.

31. The method of claim 29, wherein said changing said allocated power comprises allocating power to at least one port which had not received power in said first power source condition.

32. A method for rapidly reducing power in the event of a change in power source conditions, comprising:

obtaining an indicator of one of current power consumption and current power allocation of ports being supplied power;

calculating, for at least one possible power source condition different than a current power source condition, a projected excess demand, said projected excess demand being a function of said indicator;

storing, for said at least one possible power source condition different than said current power source condition, identifiers of ports being supplied power for which power is to be reduced, said identifiers being associated with said at least one power source condition and being a function of said projected excess demand; and in the event of a change in power source condition to a revised power source condition:

identifying said revised power source condition as one of said at least one power source condition; and reducing power to ports in accordance with said stored identifiers associated with said revised power source condition.

33. A method for rapidly reducing power in the event of a change in power source conditions, comprising:

obtaining an indicator of one of current power consumption and current power allocation of ports being supplied power;

storing, for at least two possible power source conditions different than the current power source condition, identifiers of ports being supplied power for which power is to be reduced, said identifiers being associated with a respective one of said at least two power source conditions; and in the event of a change in power source condition to a revised current power source condition different than said current power source condition:

identifying said revised current power source condition as one of said at least two power source conditions; and reducing power to ports in accordance with said stored identifiers associated with said revised current power source condition.

* * * * *

UNITED STATES PATENT AND TRADEMARK OFFICE
CERTIFICATE OF CORRECTION

| | | |
|---|---|---|
| PATENT NO. | : 7,337,336 B2 | Page 1 of 1 |
| APPLICATION NO. | : 11/118420 | |
| DATED | : February 26, 2008 | |
| INVENTOR(S) | : Alon Ferentz, Roni Blaut and Oren Lavi | |

It is certified that error appears in the above-identified patent and that said Letters Patent is hereby corrected as shown below:

Claim 4, line 2: should read as follows: power to ports is accomplished by "setting" a value to a current Signed and Sealed this Twenty-seventh Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,337,336 B2 Page 1 of 1
APPLICATION NO. : 11/118420
DATED : February 26, 2008
INVENTOR(S) : Alon Ferentz, Roni Blaut and Oren Lavi

It is certified that error appears in the above-identified patent and that said Letters Patent is hereby corrected as shown below:

Column 16, Claim 4, line 2: should read as follows: power to ports is accomplished by "setting" a value to a current This certificate supersedes the Certificate of Correction issued May 27, 2008.

Signed and Sealed this

Twenty-fourth Day of June, 2008

JON W. DUDAS
*Director of the United States Patent and Trademark Office*